United States Patent [19]

Rich

[11] Patent Number: 4,466,314

[45] Date of Patent: Aug. 21, 1984

[54] NONSLIP FASTENER TORQUING SYSTEM

[76] Inventor: Robert L. Rich, 13371 Lucille St., Garden Grove, Calif. 92644

[21] Appl. No.: 330,203

[22] Filed: Dec. 14, 1981

[51] Int. Cl.$^3$ ............................................. B25B 13/00
[52] U.S. Cl. .................................... 81/90 C; 81/459; 81/461
[58] Field of Search ................... 81/90 C, 90 E, 90 R, 81/459, 461, 475; 285/91; 403/335–337, 1

[56] References Cited

U.S. PATENT DOCUMENTS

| | | | |
|---|---|---|---|
| 1,007,107 | 10/1911 | Hulsmann | 81/459 X |
| 1,467,936 | 9/1923 | Janssen | 81/459 |
| 1,517,176 | 11/1924 | Shepherd | 81/90 R |
| 3,876,369 | 4/1975 | Behrens | 81/475 |

FOREIGN PATENT DOCUMENTS

| | | | |
|---|---|---|---|
| 647950 | 8/1928 | France | 81/90 E |
| 2338628 | 1/1977 | France | 81/461 |

Primary Examiner—Frederick R. Schmidt
Assistant Examiner—Debra S. Meislin
Attorney, Agent, or Firm—George W. Finch

[57] ABSTRACT

A fastener with a special head having a threaded recess and torque receiving recesses is matched to a tool which threadably engages the head and utilizes the threaded engagement to provide a solid base for torque applicators, such as drive pins, drive blades or a serrated drive disc so that high torque fasteners which otherwise would use Phillips, Tri-wing or Reed and Prince torquing systems, can be installed and removed without fear of the torquing tool camming out of their heads and thereby ruining them or requiring extensive jigs or other holding devices to prevent such camming action.

11 Claims, 16 Drawing Figures

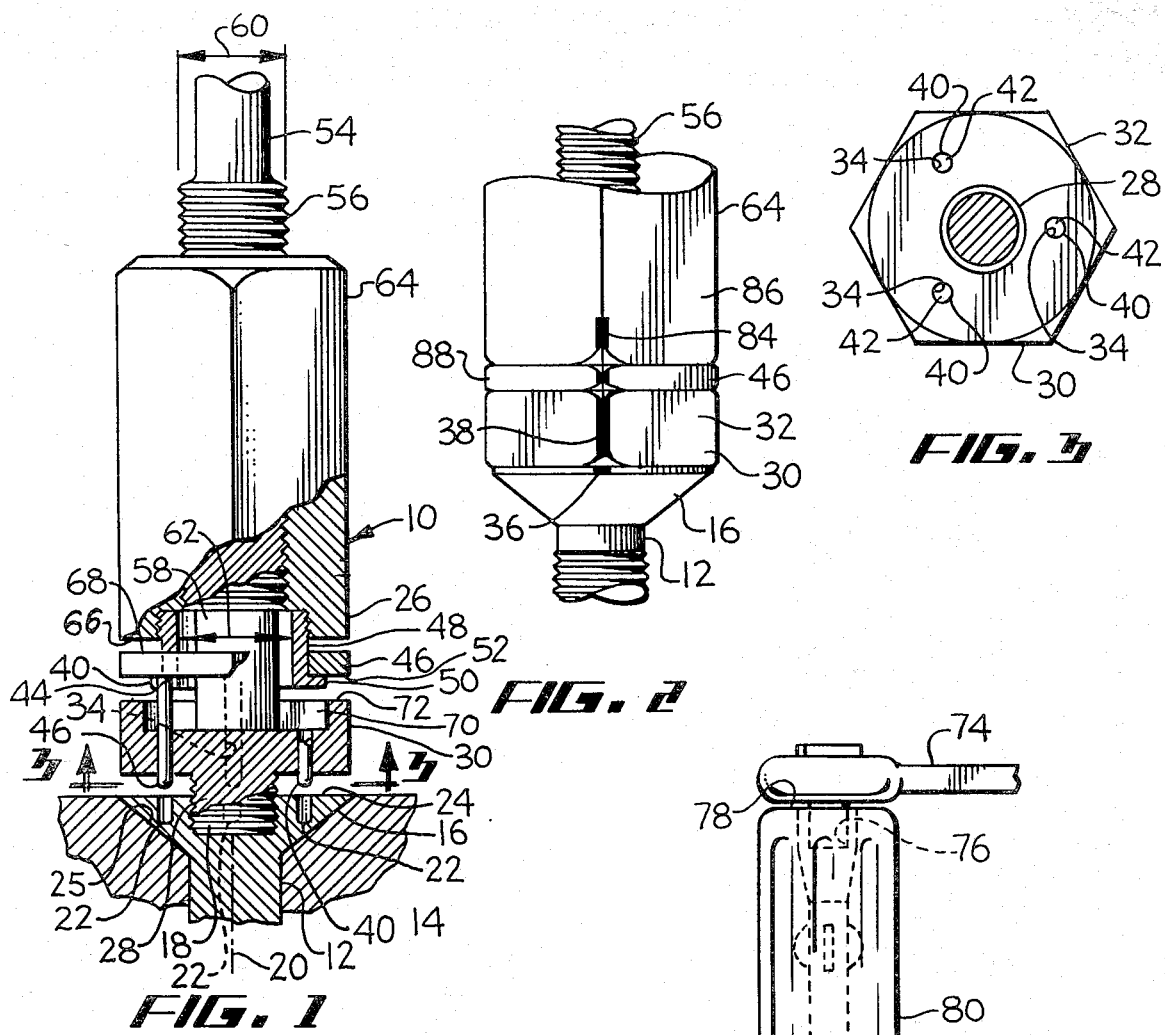

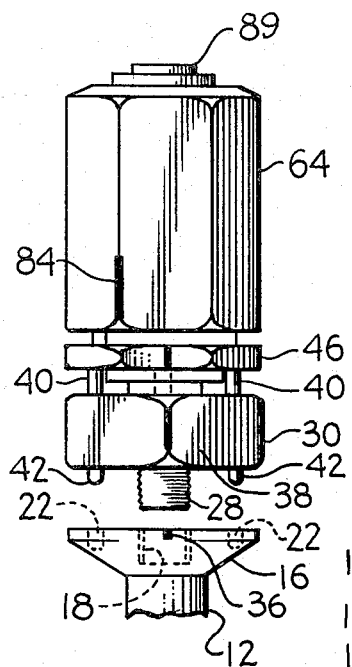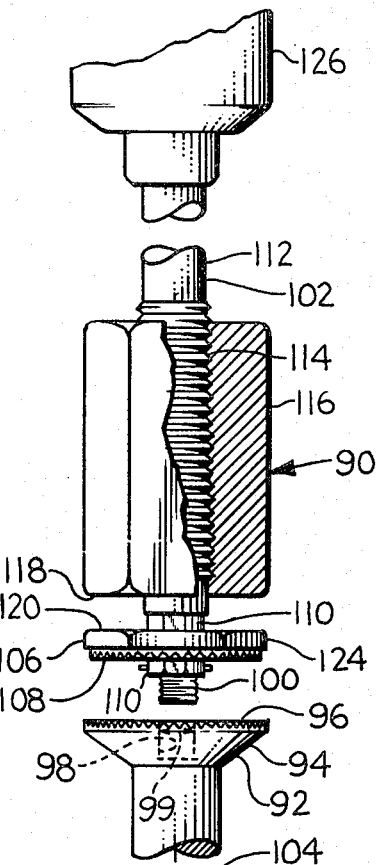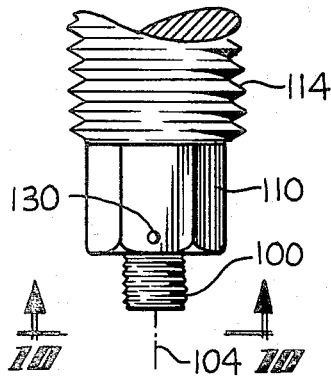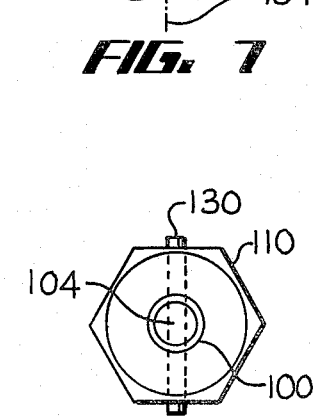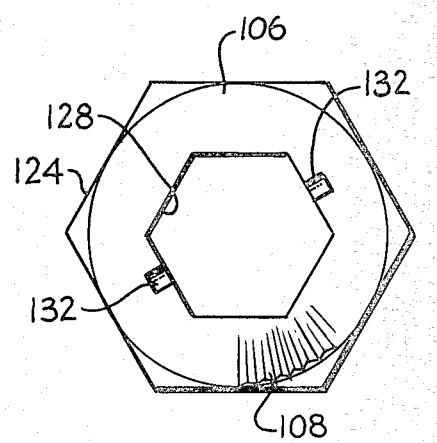

NONSLIP FASTENER TORQUING SYSTEM

BACKGROUND OF THE INVENTION

In the aerospace industry, there is an extensive use of fasteners which are torqued to high levels using conventional slots or the special torquing arrangement of Phillips, Reed and Prince, Tri-Wing or other recessed shapes, all of which tend to fail when the torquing tool is not perfectly centered or oriented with respect to the head thereof. The common failure mode is for the torquing tool to get out of axial alignment with the fastener head and cam out of the recess in the head during the application of torque. This deforms the torque application recess in the head and makes it unusable thereafter. The fasteners involved in the aerospace industry are numerous and commonly are manufactured from expensive exotic materials such as titanium. For example, a DC-10 requires about 10,000 Tri-Wing titanium flush or pan head fasteners some of which cost the airlines over $50 each. Therefore, a fairly common failure mode such as is experienced with recessed torquing systems presents a sizeable manufacturing and maintenance expense.

In some instances, the location of a fastener allows the use of exterior tooling which positively aligns the torquing tool with the fastener and through the use of clamping devices assures that the drive tool cannot cam out of the torquing recess. Unfortunately, the different locations on an aircraft require a myriad of tools all special for given locations, and in some cases the location makes such tools impossible to use. Therefore there has been a need for a positive, recessed, fastener torquing system, whose tooling can be used universally and which greatly reduces the cost of installing and removing the fasteners.

BRIEF DESCRIPTION OF THE PRESENT INVENTION

In the present invention, the fastener is provided with a central depressed threaded portion having a diameter about ½ the diameter of the shaft of the bolt with appropriate torque receiving means thereabout. The torque receiving means can include a plurality of holes near the periphery of the head for engagement by parallel drive pins, a slot across the head for receiving drive blades or a radially serrated upper surface for engagement by a similarly serrated drive disc.

The tool for torquing such fasteners includes a threaded stud which is screwed into engagement with the recessed threaded portion of the fastener to lock the tool in axial alignment therewith. Thereafter, the torque applying means are slide down toward the threaded stud until they engage the torque receiving means on the head of the fastener. Thereafter, a jam nut is threaded down on top of the torque application means to positively lock the assembly together. At that point, the fastener and tool effectively become a solid assembly and torque can be applied to the tool and the fastener by suitable means such as hexagonal wrench flats, a manual handle of sufficient size for the torque required or a socket for torquing by a conventional ratchet wrench.

Therefore it is an object of the present invention to provide a fastener torquing system which can be used repeatedly without damage to the head of the fastener.

Another object of the present invention is to eliminate the "camming out" problem commonly associated with fasteners having recessed torqued application means.

Another object of the present invention is to eliminate the need for location specialized tooling to install high torque flathead fasteners.

Another object of the present invention is to provide a torque application system which can be adapted to various sizes of fasteners and torque requirements.

Another object of the present invention is to provide a torquing system for fasteners which can be inexpensively incorporated into a production situation.

These and other objects and advantages of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 1 is an elevational view partially in cross-section showing the mechanical features of the present torquing system;

FIG. 2 is an elevational view of the system of FIG. 1 in its fastener engaged position;

FIG. 3 is a view taken on line 3—3 of FIG. 1;

FIG. 4 is an elevational view of the tool of FIGS. 1, 2 and 3 engaged with a panhead bolt being driven by a ratchet wrench;

FIG. 5 is a perspective view of the lower end of the tool of FIGS. 1 through 4 being torqued by a box wrench;

FIG. 6 is an elevational view of the system of the present invention employing a modified torquing tool;

FIG. 7 is a partial cross-sectional view of a modified form of the system of the present invention particularly useful for small size fasteners;

FIG. 8 is an elevational view of the system of FIG. 7 with the tool thereof engaged with the head of the fastener;

FIG. 9 is an enlarged detailed view of the lower portion of the tool of FIGS. 7 and 8;

FIG. 10 is a view taken on line 10—10 in FIG. 9;

FIG. 11 is an enlarged detailed view of the torque disc of the tool of FIGS. 7 through 10;

DETAILED DESCRIPTION OF THE SHOWN EMBODIMENTS

Figure 12:
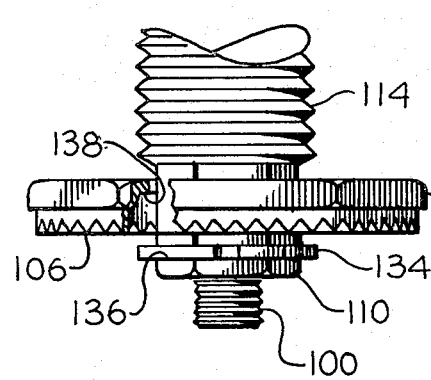
FIG. 12 is a detailed view of a modified version of the tool shown in FIGS. 7 through 11.

Referring to the drawings more particularly by reference numbers, number 10 in FIG. 1 refers to the fastener torquing system of the present invention. The system 10 includes a bolt 12 which is to be fastened to structure 14 by the application of torque to the head 16 thereof. The head 16 of the bolt 12 is shown as having a flathead shape which is adapted for use in the present system 10. The head 16 includes a threaded cavity 18 centered on the axis 20 of the bolt 12 surrounded by a plurality of pin receiving holes 22 aligned parallel to the axis 20 and perpendicular to the head surface 24. Three pin receiving holes 22 are shown, however more or less can be employed. In high stress environments, it is desirable that the holes 22 do not extend completely through the head 16 since otherwise a cutting surface may be formed which can groove the adjacent countersink portion 25.

Torque is applied to the head 16 of the bolt 12 by means of a tool 26 which includes a stud 28 adapted to threadably engage the threaded cavity 18. When the stud 28 is threadably engaged with the cavity 18 the tool 26 is locked in alignment with the axis 20 of the bolt 12. The stud 28 is fixedly connected to a pin support disc 30 which may have a hexagonal outer surface 32, as shown in FIG. 2. The pin support disc 30 has a plurality of holes 34 therethrough which are parallel to the axis 20 and positioned to align with the three holes 22 in the bolt 12 when the stud 28 is engaged with the cavity 18 and the disc 30 and stud 28 are rotationally oriented properly. This proper orientation may be assisted by alignment indicia 36 and 38 on the head 16 and the hexagonal outer surface 32 respectively. In actual service the stud 28 is screwed in as far as it will go and then backed off to the first alignment position which, when constructed as shown in FIGS. 1 and 3, would be every 120°.

When the disc 30 is properly oriented with the head 16, a plurality of pins 40 positioned in the holes 34 can be slid into the holes 22 to thereafter restrict relative rotation of the bolt 12 and the disc 30. The insertion ends 42 of the pins 40 can be rounded as shown to assist in insertion in the holes 22 and to provide clearance from the structure 14. The opposite ends 44 of the pins 40 are fixedly connected to a pin plate 46 which is slideably mounted on a lift collar 48. The pin plate 46 assures that all of the pins 40 move in unison. The lift collar 48 includes an outwardly extending flange 50 which engages the undersurface 52 of the pin plate 46 and thereby restricts its movement toward the head 16 when such is desired and also provides means to forceably remove the pins 40 from the holes 22 should that be necessary.

The pin support disc 30 is connected solidly to the drive shaft 54 of the tool 26. The drive shaft 54 includes a central threaded portion 56 spaced from the pin support disc 30 by a thread relief portion 58. The outer diameter 60 of the central threaded portion 56 is less than the inside diameter 62 of the lift collar 48 so that the collar 48 can be assembled thereover. The lift collar 48 is threadably engaged with a torque nut 64 for rotation therewith.

When it is desired to lock the pin plate 46 with its pins 40 engaged with the holes 22 of the head 16, the torque nut 64 which threadably engages the threads 56, is screwed toward the head 16 so that its lower abutment surface 66 engages the upper surface 68 of the pin plate 46 driving it downwardly. At the same time, the torque nut 64 descends toward the head 16, the flange 50 also descends until it nests in a flange relief 70 in the upper surface 72 of the disc 30. When the nut 64 is tightened down, its undersurface 66 drives the pin plate 46 so that its undersurface 52 is in engagement with the upper surface 72 of the disc 30 thereby solidly locking the system 10 together.

The stud 28 continues to maintain axial alignment of the tool 26 with the bolt 12 and the pins 40 provide means to apply torque to the head 16, such as by application of a ratchet wrench 74 applied to a suitable socket 76 in the upper end 78 of the tool 26, as shown in FIG. 4, the application of manual torque to the handle 80 thereof or the use of a wrench such as the box wrench 82 to the hexagonal outer surface 32 of pin support disc 30, as shown in FIG. 5. It should be noted that in FIG. 4, the tool 10 is being used to apply torque to a pan head bolt 83 which commonly have recessed torque applying means. Indicia 84 can also be applied to the outer hexagonal surface 86 of the torque nut 64 for easy alignment of the hexagonal surfaces 32, 86, and the hexagonal surface 88 of the pin plate so that a deep socket (not shown) can be used to apply torque uniformly to all three surfaces 32, 86 and 88. When this is desired, a substitute stub shaft 86 can be substituted for the drive shaft 54, as shown in FIG. 6.

When it is desired to drive bolts 12 of increasingly small dimension, there reaches a point where the diameter of the pins 40 becomes too small to have sufficient shear resistance, and the holes 22 cannot be inexpensively purchased. Therefore, alternate means for transferring torque from the tool to the fastener are required.

A modified system 90, shown in FIG. 7, is adapted for smaller size bolts 92. The bolt 92 includes a head 94 with a radially serrated upper surface 96 which is used to apply torque to the bolt 92. The serrated upper surface 96 surround a threaded cavity 98. It is preferable that the inner diameter 99 of the cavity 98 be about half the diameter of the shaft of the bolt 92 so that the head 94 thereof is not substantially weakened. A stud 100 is screwed into the cavity 98 to align a drive tool 102 with the axis 104 of the bolt 92. When the stud 100 is threadably engaged with the cavity 98, a drive disc 106 having a serrated lower surface 108 whose serrations match the serrations on the upper surface 96 of the bolt 92, is slid along a hexagonal shaft 110 until the surfaces 96 and 108 engage. The hexagonal shaft 110 is an extension of the drive shaft 112 of the tool 102 which also has a threaded portion 114 threadably engaging a drive nut 116. The drive nut 116 is twisted until its lower abutment surface 118 engages the upper surface 120 of the drive disc 106 locking the two surfaces 96 and 108 together as, shown in FIG. 8. Thereafter, torque applied to the hexagonal outer surface 122 of the drive nut 116 and or the hexagonal outer surface 124 of the drive disc 106 is transferred by the serrations to the bolt 92 without fear of an accidental misalignment and stripping of the torque application means provided thereby. Torque can also be provided to the tool 102 through its handle 126 or the means shown in association with FIGS. 1 through 6.

When torque is delivered to the drive disc 106 by means other than its outer hexagonal surface 124 the torque goes through the hex shaft 110 to a matching interior hexagonal surface 128 therein as shown in FIGS. 9 through 11. The disc 106 is retained on the hex shaft 110 at one end by contact with the threaded portion 114 and at the other by means such as the roll pin 130 which passes through the hexagonal shaft 110 at right angles to the axis 104. Relief grooves 132 are provided in the surface 108 so that the roll pin 130 does not interfere with the engagement of the surfaces 108 and 96. An alternate means for retaining the drive disc 106 are shown in FIG. 12 wherein a snap ring 134 is retained in a groove 136 in the hexagonal surface 110 for retaining the drive disc 106. When the ring 134 is used, a suitable relief groove 138 is provided in the undersurface 108 to allow proper engagement of the surfaces 108 and 96.

Figure 14:
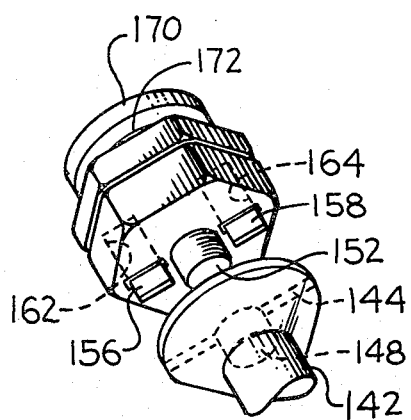
FIG. 14 is a perspective view of the torque application portion of the tool shown in FIG. 13.
Figure 13:
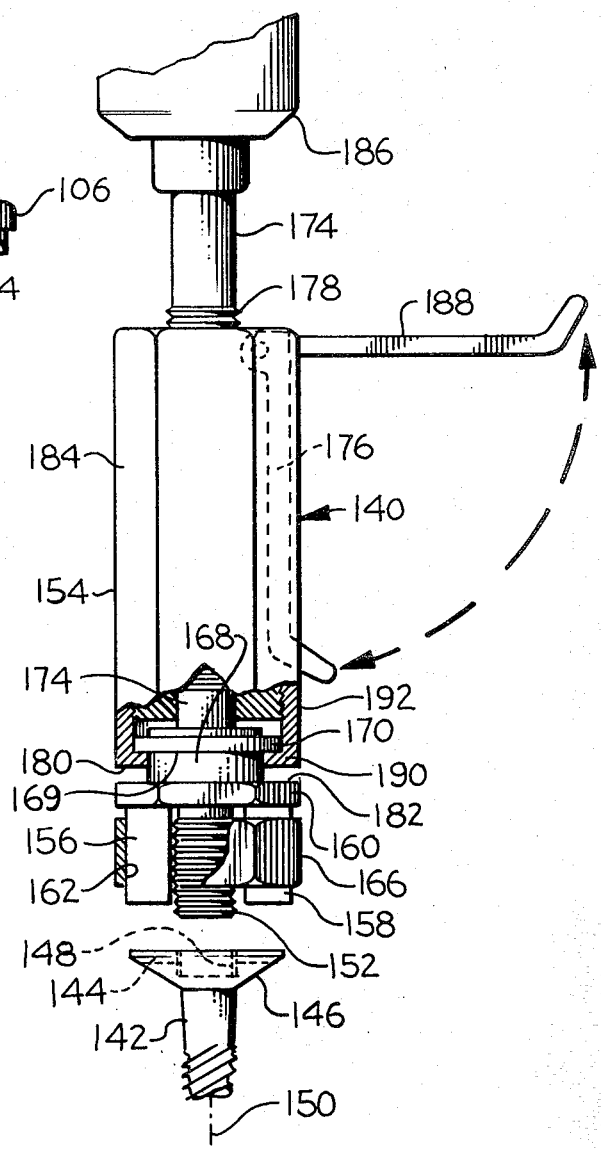
FIG. 13 is a modified form of the present invention, particularly adapted for slotted head screws.

A modified system 140 is shown in FIGS. 13 and 14 for driving fasteners, such as screw 142, when it is desirable to have a slot 144 in the head 146 thereof so that they can be used with conventional screwdrivers in an emergency. The screw 142 includes a threaded cavity 148 aligned with the axis 150 of the screw 142. In use, the threaded cavity 148 is threadably engaged by a stud 152 of the drive tool 154 thereof to lock the tool 154 in axial alignment with a screw 142.

The tool 154 includes a pair of slot engaging blades 156 and 158 which are fixedly connected to a blade plate 160 and extend down through slots 162 and 164 in a blade support nut 166. The blade support nut 166 may be threadably engaged on the stud 152, as shown, or may be integral therewith, and it functions to transfer torque into the blades 156 and 158.

The blade plate 160 includes an upwardly extending shaft 168 with a groove 169 in which is positioned a snap ring 170. The shaft 168 is hollow, the drive shaft 174 of the tool 154 passing therethrough for solid connection to the stud 152. The tool 154 includes a large drive nut 176 which threadably engages the central threaded portion 178 of the drive shaft 174 so that the drive nut 176 can be screwed down until its lower surface 180 engages the upper surface 182 of the blade plate 160 to push the blades 156 and 158 into the slot 144 of the screw 142 and retain them there for torquing. The drive nut 176 may have a hexagonal outer surface 184 for application of such torque. Torque also can be applied by means of a handle 186 connected to the drive shaft 174 or to a pivotally mounted torque amplifying lever 188 mounted thereto. However, the lever 188 primarily provides means to optionally turn down or disengage the tool 140 from the fastener 142.

The snap ring 170 is engaged by an inwardly facing radial flange 190 which is the lower portion of a collar 192 forming a threadably engaged, lower portion of the drive nut 176. When the drive nut 176 is torqued in the opposite direction the flange 190 lifts on the snap ring 170 to remove the blades 156 and 158 from the slot 144 so that thereafter the stud 152 of the tool 154 can be rotated with respect to the screw 142 and removed therefrom.

Figure 15:
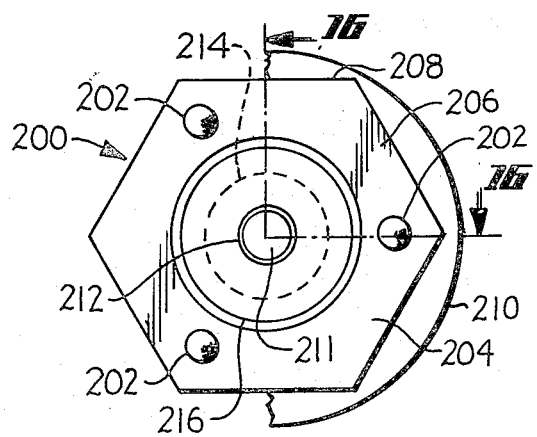
FIG. 15 is a underside view of a further modified version of the tool.
Figure 16:
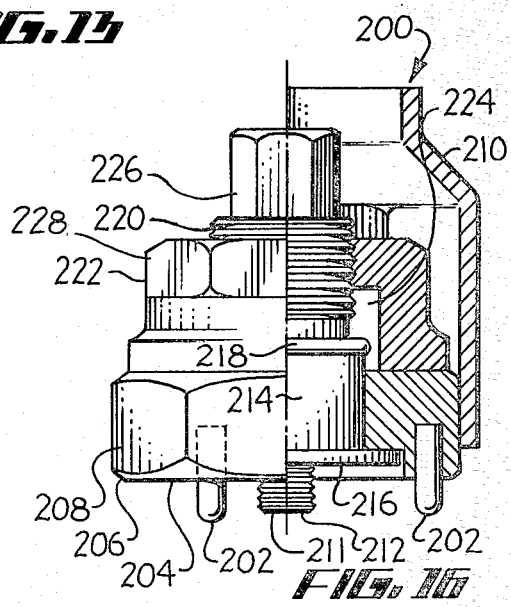
FIG. 16 is a partial cross-sectional view of the tool of FIG. 15 taken on line 16—16.

A further modified system 200 for driving fasteners is shown in FIGS. 15 and 16. In this case, a plurality of pins 202 extend out the bottom surface 204 of a pin plate 206 having an hexagonal outer surface 208 so it can be engaged by means such as the deep socket 210. A central member 211 having a screw portion 212 also extends out the bottom surface 204 of the pin plate 206 which is used as previously described to actively engage a fastener having a centrally located threaded orifice, such as bolt 12. the pins 202 being adapted for engagement with the pin holes 22. Above the screw portion 212 of the central member 211 is a cylindrical portion 214 bounded by a flange 216 and an O ring 218 which capture it about the pin plate 206 but allow relative rotation thereof. The central member 211 also includes an upper threaded portion 220 which is threadedly engaged by a nut 222 having a recess 224 to clear the O ring 218 and a portion of the cylindrical portion 214. An hexagonal head 226 is provided on the opposite end of the screw portion 220 from the screw portion 212 so that torque can be applied independently to the central member 211.

When used, torque is applied to the nut 222 so that the screw portion 212 engages the fastener, preferably, until the flange 216 engages the upper surface of the fastener. At that point, the pin plate 206 is rotated until its pins 202 can slide down within the pin holes 22 of the fastener. Thereafter the nut 222 is torqued down against the pin plate 206 by means of its hexagonal surface 228. The socket 210 is slipped down over the pin plate 206 as shown and is used to torque the fastener attached thereto.

When removing the system 200 from the fastener, the socket 210 is removed and a suitable smaller size socket, not shown is used to rotate the nut 222 to provide clearance so that the pins 20 can be disengaged from the fastener 12. Thereafter, the bolt head 226 can be torqued to release the screw portion 212 from the fastener 12.

Thus there has been shown and described a novel system for applying torque to high torque fasteners which fulfills all of the objects and advantages sought therefore. Many changes, alterations, modifications and other uses and applications of the subject system will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. A fastener torquing system including:
    a fastener having a head with:
        female threaded engagement means including:
            a threaded cavity defined in said fastener head; and
        torque receiving means generally spaced about said female threaded engagement means, said torque receiving means including:
            a plurality of cavities generally cylindrical in shape and generally parallel to said defined threaded cavity which pass through at least a portion of said fastener head; and
    a tool having:
        male threaded engagement means adapted to engage said female threaded engagement means including:
            a screw sized and positioned to engage said threaded cavity, said screw having a longitudinal axis;
        torque application means generally spaced about said male threaded engagement means and positioned to engage said torque receiving means when said male and female threaded engagement means are engaged, said torque application means including:
            a plurality of pins generally cylindrical in shape and oriented generally parallel to said longitudinal axis of said screw and being positioned and sized to be placed in said plurality of cavities;
            a pin plate to which said pins are fixedly attached, said pin plate being adapted to slide a limited distance along said longitudinal axis; and
            a pin support disc positioned between said pin plate and said screw, said pin support disc being fixedly connected to said screw, forming a plurality of cylindrical cavities through which said pins are positioned, and having an abutment surface adapted to engage said fastener head; and
        drive means to apply torque to said torque application means to thereby apply torque to said fastener.

2. The fastener torquing system as defined in claim 1 wherein said drive means are flat surfaces formed about said pin support disc.

3. The fastener torquing system as defined in claim 1 wherein said torque application means further include:

a threaded shaft extending along said longitudinal axis on the opposite side of said pin support disc from said screw; and a torque nut on said threaded shaft, said torque nut having an abutment surface positioned to engage said pin plate to move said plurality of pins into said plurality of fastener head cavities and when properly torqued to retain said plurality of pins in said plurality of fastener head cavities when said screw is in engagement with said threaded cavity.

4. The fastener torquing system as defined in claim 3 including:
indicia on said torque nut and said pin support disc to indicate the proper relative rotational orientation therebetween for torquing said fastener.

5. The fastener torquing system as defined in claim 4 including:
indicia on said fastener head to indicate the proper relative rotational orientation between said torque nut and said pin support disc, and said fastener.

6. The fastener torquing system as defined in claim 1 wherein said torque application means further include:
a threaded shaft extending along said longitudinal axis on the opposite side of said pin support disc from said screw, said threaded shaft having an end opposite from said screw, and said drive means being incorporated at said opposite end of said threaded shaft.

7. A fastener torquing system including:
a fastener having a head with:
female threaded engagement means including:
a threaded cavity defined in said fastener head; and
torque receiving means generally spaced about said female threaded engagement means, said torque receiving means including:
a plurality of cavities generally cylindrical in shape and generally parallel to said defined threaded cavity which pass through at least a portion of said fastener head; and
a tool having:
male threaded engagement means adapted to engage said female threaded engagement means including:
a screw sized and positioned to engage said threaded cavity, said screw having a longitudinal axis;
torque application means generally spaced about said male threaded engagement means and positioned to engage said torque receiving means when said male and female threaded engagement means are engaged, said torque application means including:
a plurality of pins generally cylindrical in shape and oriented generally parallel to said longitudinal axis of said screw and being positioned and sized to be placed in said plurality of cavities;
a pin plate to which said pins are fixedly attached, said pin plate being adapted to slide a limited distance along said longitudinal axis; and having an abutment surface adapted to engage said fastener head;
a threaded shaft extending along said longitudinal axis on the opposite side of said pin plate from said screw; and
a torque nut on said threaded shaft, said torque nut having an abutment surface positioned to engage said pin plate to move said plurality of pins into said plurality of fastener head cavities and when properly torqued to retain said plurality of pin in said plurality of fastener head cavities when said screw is in engagement with said threaded cavity; and drive means to apply torque to said torque application means to thereby apply torque to said fastener.

8. The fastener torquing system as defined in claim 7 wherein said threaded shaft has an end opposite from said screw, said drive means including:
screw drive means incorporated at said opposite end of said threaded shaft.

9. A fastener torquing system including:
a fastener having a head with:
a female threaded engagement means including:
a threaded cavity defined in said fastener head; and
torque receiving means generally spaced about said female threaded engagement means, said torque receiving means including:
a first serrated radial surface generally perpendicular to said defined threaded cavity; and
a tool having:
male threaded engagement means adapted to engage said female threaded engagement means including:
a screw sized and positioned to engage said threaded cavity, said screw having a longitudinal axis;
torque application means generally spaced about said male threaded engagement means and positioned to engage said torque receiving means when said male and female threaded engagement means are engaged, said torque application means including:
a second serrated radial surface generally perpendicular to said longitudinal axis of said screw, said first serrated radial surface being positioned to engage said second serrated radial surface so that torque can be transferred therebetween:
a plate having said second serrated radial surface thereon, said plate being adapted to slide a limited distance along said longitudinal axis;
a threaded shaft extending along said longitudinal axis on the opposite side of said plate from said screw; and
a torque nut on said threaded shaft, said torque nut having an abutment surface positioned to engage said plate to move said second serrated radial surface into engagement with said first serrated radial surface and when properly torqued to retain said second serrated radial surface in engagement with said first serrated radial surface when said screw is in engagement with said threaded cavity; and
drive means to apply torque to said torque application means to thereby apply torque to said fastener.

10. The fastener torquing system as defined in claim 9 wherein said drive means are flat surfaces formed about said plate.

11. A fastener torquing system including:
a fastener having a head with:
a female threaded engagement means including:
a threaded cavity defined in said fastener head; and
torque receiving means generally spaced about said female threaded engagement means, said torque receiving means including:
at least one slot generally parallel to said defined threaded cavity formed in said fastener head; and
a tool having:
male threaded engagement means adapted to engage said female threaded engagement means including:

a screw sized and positioned to engage said threaded cavity, said screw having a longitudinal axis;

torque application means generally spaced about said male threaded engagement means and positioned to engage said torque receiving means when said male and female threaded engagement means are engaged, said torque application means including:

a plurality of blades oriented generally parallel to said longitudinal axis of said screw and being positioned to be placed in said at least one slot;

a blade plate to which said plurality of blades are fixedly attached, said blade plate being adapted to slide a limited distance along said longitudinal axis and having an abutment surface adapted to engage said fastener head;

a threaded shaft extending along said longitudinal axis on the opposite side of said blade plate from said screw; and a torque nut on said threaded shaft, said torque nut having an abutment surface positioned to engage said blade plate to move said plurality of blades in said at least one slot and when properly torqued to retain said plurality of blades in said at least one slot when said screw is in engagement with said threaded cavity; and drive means to apply torque to said torque application means to thereby apply torque to said fastener.

* * * * *